C. KELKER.
AMUSEMENT DEVICE.
APPLICATION FILED APR. 3, 1914.

1,112,216.

Patented Sept. 29, 1914.
2 SHEETS—SHEET 1.

Witnesses

Inventor
Charles Kelker
By W. N. Roach, Jr.
Attorney

C. KELKER
AMUSEMENT DEVICE.
APPLICATION FILED APR. 3, 1914.

1,112,216.

Patented Sept. 29, 1914.
2 SHEETS—SHEET 2.

Witnesses

Inventor
Charles Kelker
By W. N. Roach, Jr.
Attorney

UNITED STATES PATENT OFFICE.

CHARLES KELKER, OF PHILADELPHIA, PENNSYLVANIA.

AMUSEMENT DEVICE.

1,112,216.  Specification of Letters Patent. Patented Sept. 29, 1914.

Application filed April 3, 1914. Serial No. 829,224.

*To all whom it may concern:*

Be it known that I, CHARLES KELKER, a citizen of the United States of America, residing at Philadelphia, in the county of Philadelphia and State of Pennsylvania, have invented certain new and useful Improvements in Amusement Devices, of which the following is a specification.

This invention relates to amusement devices and more particularly to that form of such devices wherein a horse or the like is provided and which may be propelled by the rider thereof.

The objects of the invention are to provide a horse or the like, mounted upon a suitable track, or rail and equipped with propelling mechanism whereby the rider may cause such horse to travel over the track or rail.

With these and such other objects in view as may hereinafter more fully appear, my invention consists in the novel arrangement and construction of parts set forth in the following specification; more particularly pointed out in the claim and which are shown in the accompanying drawings, wherein:—

Figure 1:
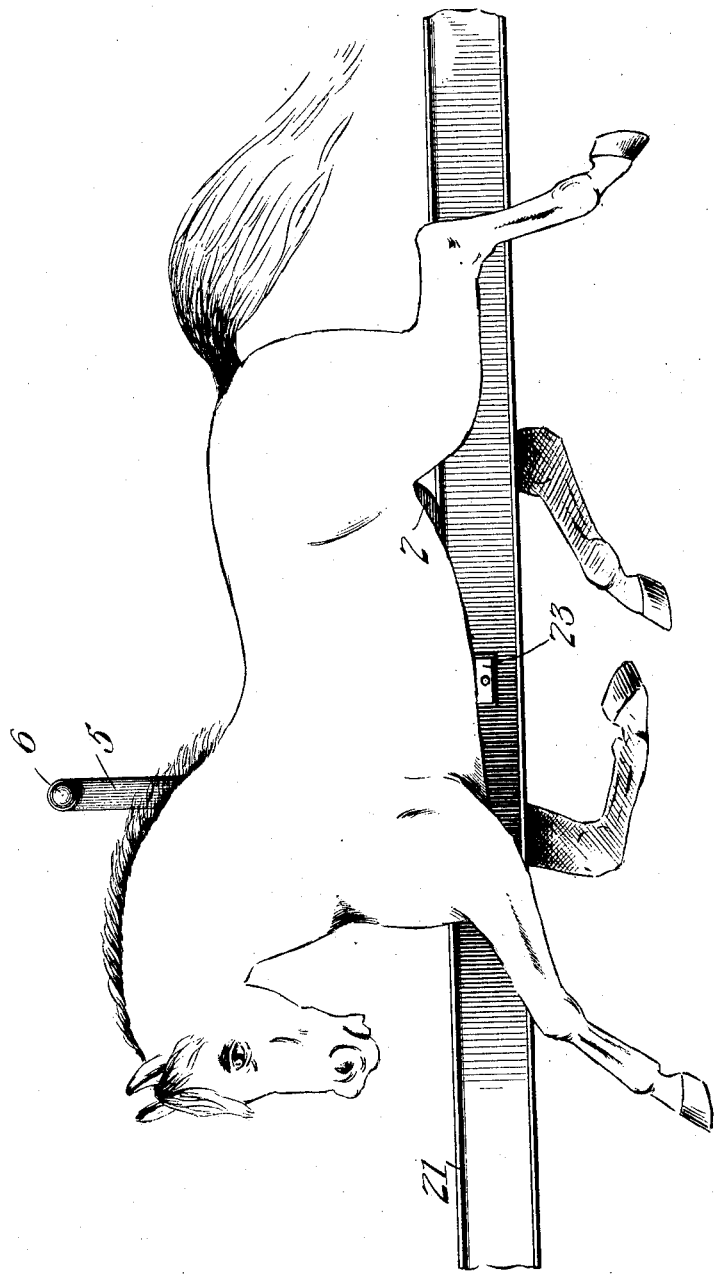
Figure 2:
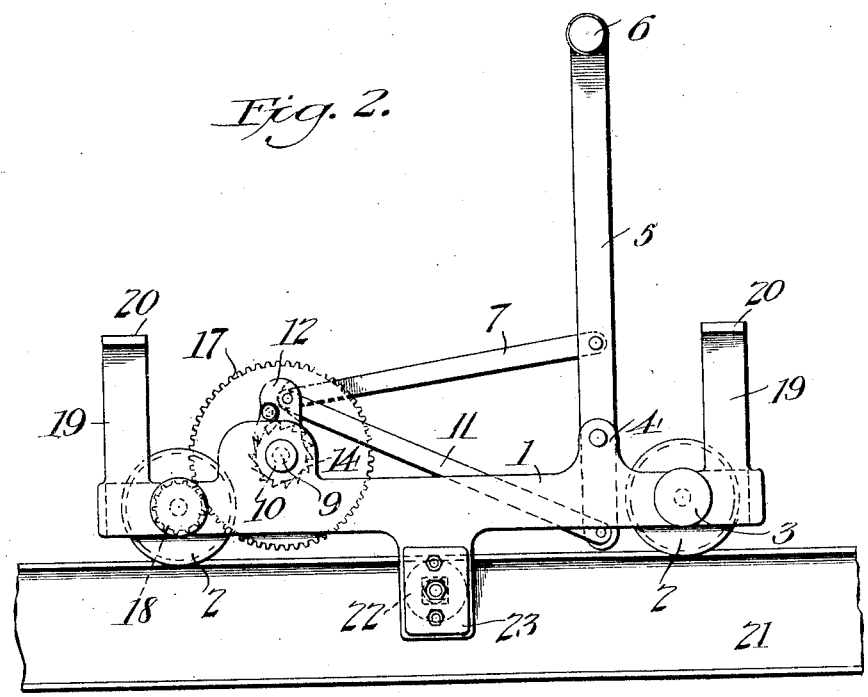
Figure 3:
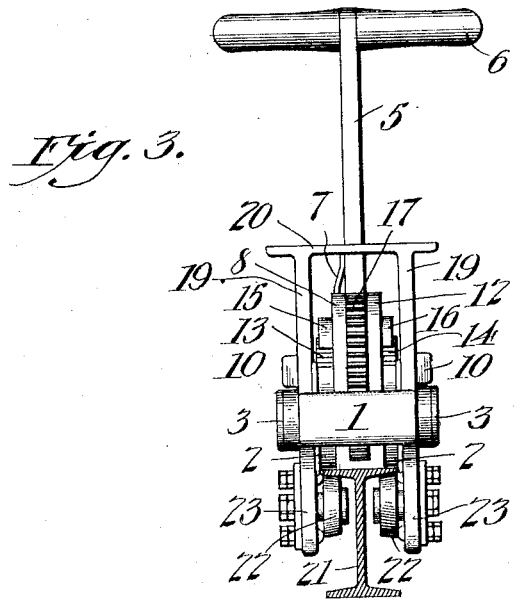

Figure 1 is a side elevation of a horse, constructed in accordance with my invention. Fig. 2 is a side elevation of the operative mechanism, the horse being removed therefrom. Fig. 3 is a rear elevation of the operative mechanism.

Referring to said drawings by numerals, a suitable substantially rectangular frame 1, is mounted on flanged wheels 2, positioned at either end thereof, and having their axles journaled in casings 3 mounted on the sides of said frame, as shown most clearly in Figs. 2 and 3. Pivotally mounted between the ears 4, formed at a suitable point on the sides of said frame 1, is a lever arm 5, provided at its upper end with the handle, or hand gripping cross bar 6. A link 7 has one end pivotally connected to lever 5, above the fulcrum of said lever, and its other end pivoted to an oscillating member 8, which is loosely mounted on a shaft 9 extending transversely across the frame 1 and journaled in suitable boxes or casings 10 formed on said frame. A link 11 has one end pivotally connected to said lever arm 5, at a point below the fulcrum thereof, and its other end pivoted to an oscillating member 12 loosely mounted on the aforesaid shaft 9. Shaft 9 has securely mounted thereon the ratchet wheels 13 and 14, the teeth of which are adapted to be engaged by the pawls 15 and 16, carried by the oscillating members 8 and 12 respectively. Shaft 9 has also securely mounted thereon, near the center thereof, a gear 17 the teeth of which are adapted to engage the teeth of a spur gear 18, securely mounted on the axle of the rear pair of wheels 2.

The frame 1 is provided, at either end, with a pair of upstanding arms or supports 19, upon the cross bar 20, on which the horse or other figure is adapted to rest and to which it may be fastened in any suitable manner. The flanged wheels 2 are adapted to ride upon an I beam or rail 21, the under surface of the tread of said rail being contacted by cone shaped wheels 22 which are adjustably journaled in the depending portions 23 of said frame 1.

The operation of the device is as follows:—A rider being seated upon the horse, in the usual manner, grasps the cross bar 6 and alternately pulls it toward and pushes it away from himself. When pulling toward himself the link 7 will actuate oscillating member 8 and through its pawl 15, rotate ratchet wheel 13 and with it shaft 9 and gear 17, thereby causing revolution of rear wheels 2. During this operation the link 11 will be actuating oscillating member 12 in the opposite direction causing pawl 16 to ride over ratchet wheel 14. Upon reversing the motion link 11 will perform the operation just described for link 7 and link 7 will be drawing its oscillating member forward for another stroke. In this manner we have a continuous revolution of the shaft 9 and a consequent continuous drive for the rear wheels 2, thereby propelling the device along the rail or track.

Having described my invention, what I claim as new and desire to secure by Letters Patent, is:—

In a device of the character described, a rail, a suitable frame, wheels journaled in said frame and engaging said rail, a lever pivotally secured to said frame, a shaft journaled in said frame, oscillating members loosely mounted on said shaft, pawls carried by said oscillating members, ratchet wheels secured to the aforesaid shaft and adapted to be engaged by said pawls, links, pivotally connecting said lever and said
5 oscillating members to revolve said shaft, and driving mechanism interposed between said shaft and said wheels.

In testimony whereof I hereunto affix my signature in presence of two witnesses.

CHARLES KELKER.

Witnesses:
 JOHN S. SORENSEN,
 CHARLES LOWELL HOWARD.

---

Copies of this patent may be obtained for five cents each, by addressing the "Commissioner of Patents, Washington, D. C."